United States Patent
Gundavelli et al.

(10) Patent No.: US 9,847,932 B2
(45) Date of Patent: Dec. 19, 2017

(54) MOBILE GATEWAY REDUNDANCY WITH ACTIVE STANDBY

(71) Applicant: Cisco Technology, Inc., San Jose, CA (US)

(72) Inventors: Srinath Gundavelli, San Jose, CA (US); Jason D. Dachtler, Tiburon, CA (US); Sachin Gorde, Milpitas, CA (US)

(73) Assignee: Cisco Technology, Inc., San Jose, CA (US)

( * ) Notice: Subject to any disclaimer, the term of this patent is extended or adjusted under 35 U.S.C. 154(b) by 166 days.

(21) Appl. No.: 14/848,900

(22) Filed: Sep. 9, 2015

(65) Prior Publication Data

US 2017/0070420 A1   Mar. 9, 2017

(51) Int. Cl.
| | |
|---|---|
| *H04L 12/707* | (2013.01) |
| *H04L 12/703* | (2013.01) |
| *H04W 76/02* | (2009.01) |
| *H04W 88/16* | (2009.01) |
| *H04W 24/04* | (2009.01) |
| *H04W 48/00* | (2009.01) |

(52) U.S. Cl.
CPC ............. *H04L 45/22* (2013.01); *H04L 45/28* (2013.01); *H04W 76/022* (2013.01); *H04W 24/04* (2013.01); *H04W 48/17* (2013.01); *H04W 88/16* (2013.01)

(58) Field of Classification Search
CPC ...... H04L 45/22; H04L 45/28; H04W 76/022; H04W 24/04; H04W 48/17; H04W 88/16

USPC .................................................. 370/216, 221
See application file for complete search history.

(56) References Cited

U.S. PATENT DOCUMENTS

| | | | |
|---|---|---|---|
| 7,633,921 B2 | 12/2009 | Thubert et al. | |
| 8,264,956 B2 | 9/2012 | Ramankutty et al. | |
| 8,272,046 B2 | 9/2012 | Gundavelli et al. | |
| 8,441,983 B2 | 5/2013 | Calhoun et al. | |
| 8,446,876 B2 | 5/2013 | Calhoun et al. | |
| 8,499,336 B2 | 7/2013 | Alex et al. | |
| 8,520,595 B2 | 8/2013 | Yadav et al. | |
| 8,675,601 B2 | 3/2014 | Calhoun et al. | |
| 8,687,609 B2 | 4/2014 | Gundavelli et al. | |
| 8,724,583 B2 | 5/2014 | Gundavelli et al. | |
| 8,923,260 B2 | 12/2014 | Gundavelli et al. | |
| 2010/0061226 A1* | 3/2010 | Morishige ............... H04L 12/66 370/216 |
| 2013/0044608 A1 | 2/2013 | Qiang et al. | |

(Continued)

*Primary Examiner* — Obaidul Huq
(74) *Attorney, Agent, or Firm* — Edell, Shapiro & Finnan, LLC

(57) ABSTRACT

A local mobility anchor (LMA) connected to a network receives session requests sent by first and second gateways on behalf of a mobile node seeking to establish a mobility session with the network. The LMA selects, based on a gateway selection criterion, either a first or a second gateway as active for actively handling the mobility session and the other gateway as standby. The LMA commands the active gateway to actively handle the mobility session and to configure the mobile node to use the active gateway for the mobility session. The LMA commands the standby gateway to not configure the mobile node and to operate in active standby to handle a failover of the mobility session from the primary gateway. The LMA establishes with the active gateway a first IP tunnel to be used for the mobility session.

22 Claims, 9 Drawing Sheets

(56) References Cited

U.S. PATENT DOCUMENTS

2013/0114404 A1  5/2013  Yang
2013/0135990 A1* 5/2013  Draznin ............... H04W 48/17
                                            370/221

* cited by examiner

MOBILE GATEWAY REDUNDANCY WITH ACTIVE STANDBY

TECHNICAL FIELD

The present disclosure relates to support of mobility sessions with mobile gateway redundancy.

BACKGROUND

In a Proxy Mobile Internet Protocol version 6 (PMIP or PMIPv6), there is an assumption that a single router with mobile access gateway (MAG) capability (referred to as a MAG) is present to support a mobile node on an access link. The techniques used by the mobile node to discover the MAG, or the attach triggers upon which the MAG relies to initiate signaling to a local mobility anchor (LMA), are based on the aforementioned single MAG assumption. In a mobility architecture deployment there is often a need to support MAG redundancy for failover recovery. MAG failover recovery based on the single MAG assumption result in time consuming switch over to a redundant MAG. This results in an under utilization of network resources.

DESCRIPTION OF EXAMPLE EMBODIMENTS

Overview

At a local mobility anchor (LMA) connected to a network, session requests, sent by a first gateway and a second gateway on behalf of a mobile node seeking to establish a mobility session with the network via the local mobility anchor and either the first gateway or the second gateway, are received. Responsive to the received session requests, based on a gateway selection criterion, either the first gateway or the second gateway is selected as an active gateway for actively handling the mobility session and the other of the first gateway and second gateway is selected as a standby gateway. The active gateway is commanded to actively handle the mobility session and to configure the mobile node to use the active gateway for the mobility session. The standby gateway is commanded to not configure the mobile node and to operate in active standby to handle a failover of the mobility session from the primary gateway. A first IP tunnel is established with the active gateway to be used for the mobility session.

Example Embodiments

Figure 1:
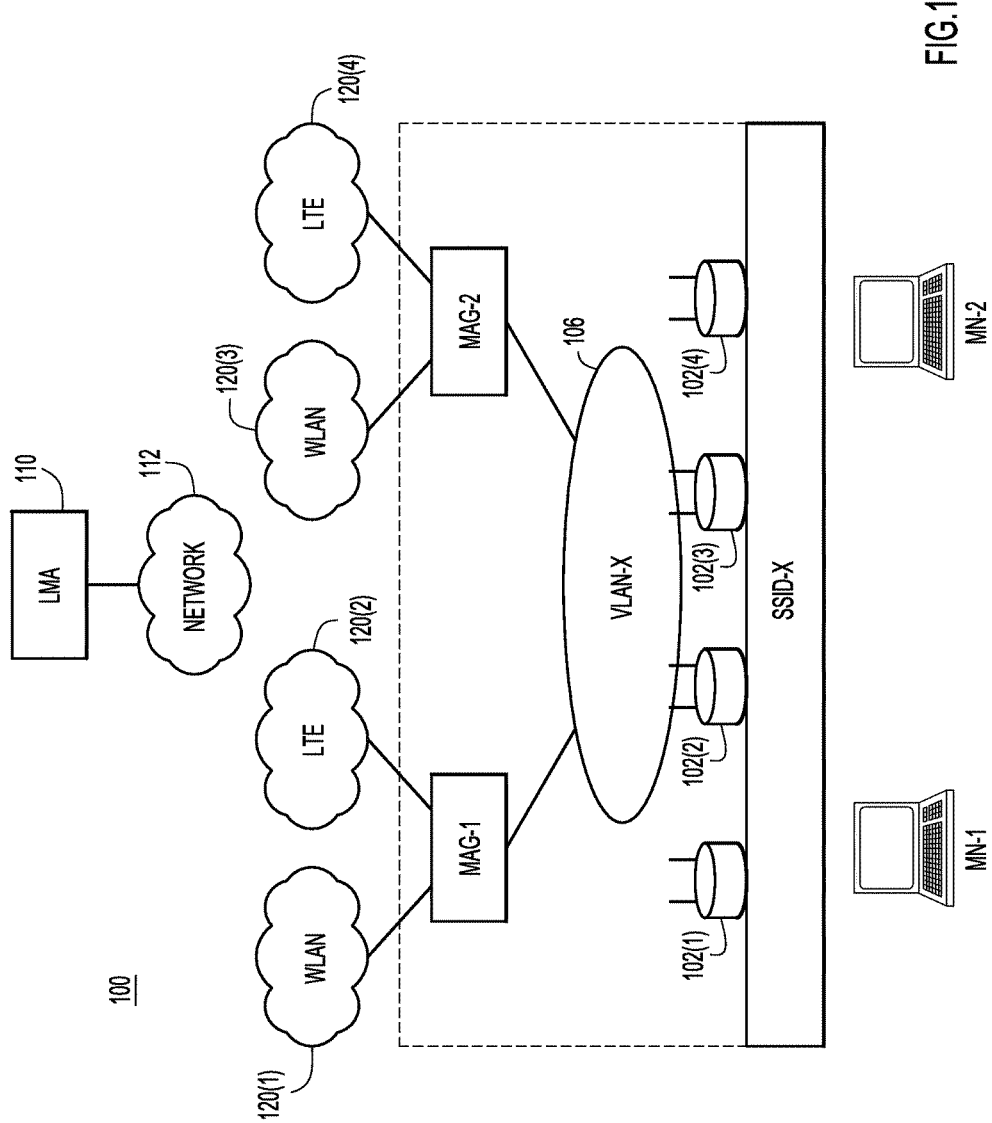
FIGS. 1 and 2 are diagrams of a mobile network environment in which mobile gateway redundancy with active standby is enabled, according to example embodiments.

Referring first to FIG. 1, there is shown a block diagram of an example mobile network environment 100 in which embodiments presented herein may be implemented. Network environment 100 includes multiple wireless access points APs 102(1)-102(4) associated with a service set identifier X (SSID-X) and connected to first and second network routers, each having mobile access gateway (MAG) capability (and thus referred to herein as MAG-1 and MAG-2), over a local network 106, such as a virtual local area network (VLAN) identified as VLAN-X. Network environment 100 includes wireless client devices or mobile nodes (MNs) MN-1 and MN-2 that connect wirelessly with APs 102. Together, local network 106 and wireless connections between mobile nodes MN-1 and MN-2 and APs 102(1)-102(4) may represent a single layer 2 broadcast domain or access link (or access network) through which the mobile nodes access MAG-1 and MAG-2.

Network environment 100 also includes a local mobility anchor (LMA) 110 connected with a communication network 112, which may include one or more wide area networks (WANs), such as the Internet, and one or more local area networks (LANs). In an embodiment, MAG-1 and MAG-2 communicate with one or more wireless networks 120(1)-120(4) connected with network 112 and thus communicate with LMA 110 through wireless networks 120 and network 112. Wireless networks 120 may include wireless LANs and Long-Term Evolution (LTE) networks, for example. In another embodiment, MAG-1 and MAG-2 may have wired connections with network 112. Thus, mobile nodes MN-1 and MN-2 are able to communicate with LMA 110 through APs 102(1)-102(4), MAG-1- and MAG-2, and network 112. It is understood that FIG. 1 is meant as an example of a mobile network environment and that the environment may include more or less mobile nodes, MAGs, and APs.

In an embodiment, MAG-1 and MAG-2, mobile nodes MN-1 and MN-2, and APs 102(1)-102(4) may be deployed together on a mobile transportation platform to form a mobility portion of network environment 100. In this case, local area network 106 may be a train-wide Ethernet network, for example.

Mobile nodes MN-1 and MN-2, MAG-1 and MAG-2, and LMA 110 may operate in accordance with a network-based mobility management protocol, such as Proxy Mobile IPv6 (PMIPv6), to enable the mobile nodes to access core networks in network 112 (not shown in FIG. 1) through the MAG-1 and MAG-2, and LMA 110. Under the mobility management protocol, a given one of mobile nodes MN-1 and MN-2 may connect wirelessly with one of MAG-1 and MAG-2 (referred to as the "connected MAG"). In turn, the connected MAG establishes with LMA 110 an IP tunnel through which the connected MAG and LMA 110 tunnel IP traffic to and from the given mobile node from and to one of the core networks connected with LMA 110. The IP tunnel and associated routing of IP traffic to and from the given mobile node through the IP tunnel by the connected MAG and LMA 110 are collectively referred to herein as a "mobility session," and the connected MAG that supports the mobility session is referred to as an anchor that "actively handles" the mobility session of behalf of the mobile node to which the MAG is connected. At any given time, each of MAG-1 and MAG-2 may concurrently actively handle multiple mobility sessions on behalf of respective ones of multiple mobile nodes.

According to embodiments presented herein, each of MAG-1 and MAG-2 operates to actively handle mobility sessions on behalf of respective ones of mobile nodes, generally. For a given one of the mobility sessions, LMA 110 selects one of MAG-1 and MAG-2 as a primary MAG to actively handle the given mobility session and the other MAG as a secondary MAG to operate on "active standby" to handle a failover of the given mobility session from the primary MAG, if necessary. The primary MAG is said to be in an active-active mode with respect to the mobility session and the secondary MAG is a redundant MAG said to be in an active-standby or hot-standby with respect to the mobility session. The terms "primary" and "active" are used interchangeably herein and the terms "secondary" and "standby" are also used interchangeably herein. For example, the terms "primary gateway" and "secondary gateway" may also be referred to as "active gateway" and "standby gateway."

Figure 2:
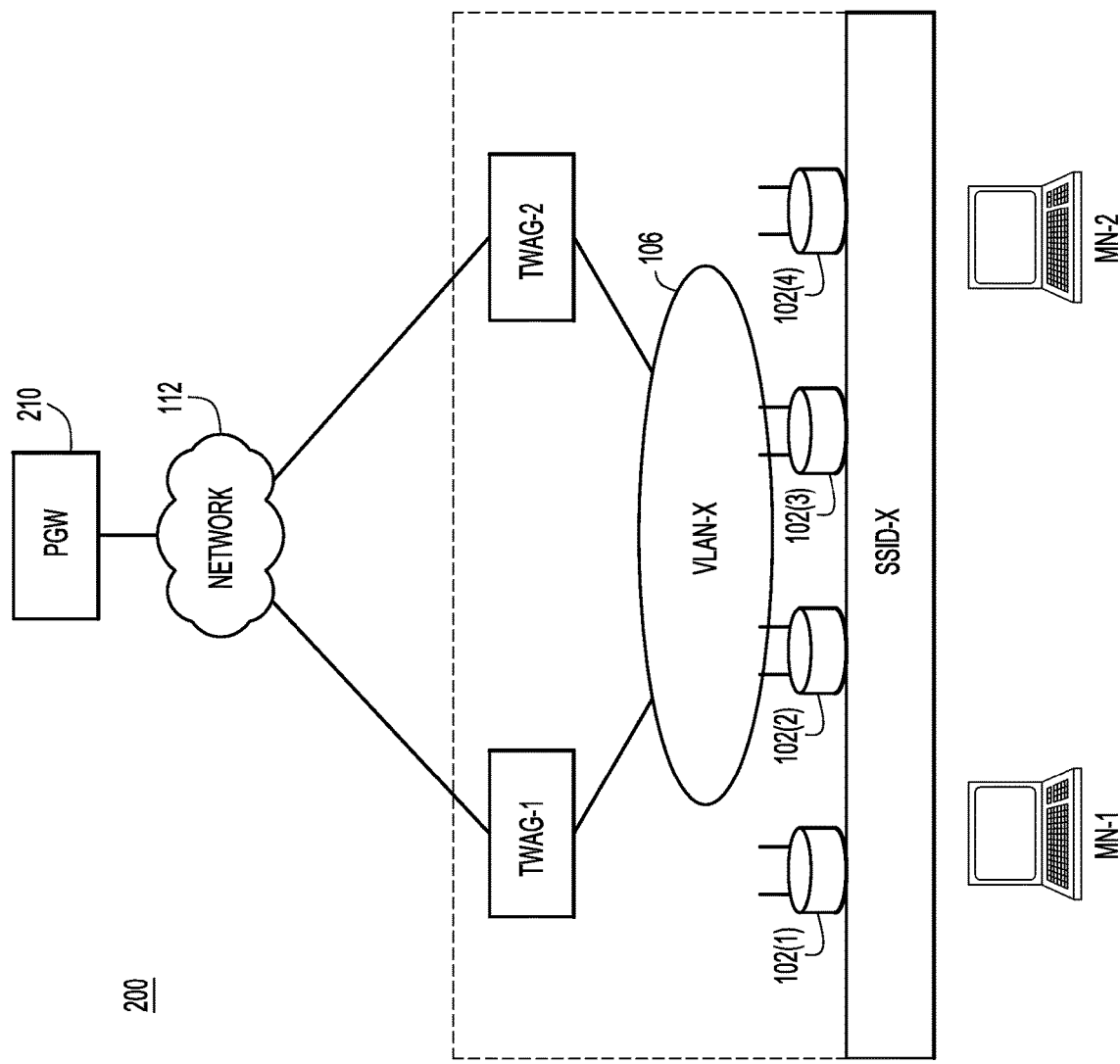

Referring to FIG. 2, there is shown a block diagram of an example mobile network environment 200, compatible with S2a Mobility over General Packet Radio Service (GPRS) Tunneling Protocol (GTP) Gateway (SaMOG), in which embodiments presented herein may also be implemented. Network environment 200 is similar to network environment 100, except that in network environment 200, MAG-1 and MAG-2 of FIG. 1 are implemented as part of Trusted WLAN Access Gateways (TWAGs) TWAG-1 and TWAG-2, respectively, and LMA 110 is implemented as part of a Packet Data Network Gateway (PGW) 210. For purposes of generality, the terms "gateway" and "MAG" are meant to refer to both a MAG and a TWAG and the term LMA is meant to cover both an LMA and a PGW.

Figure 3:
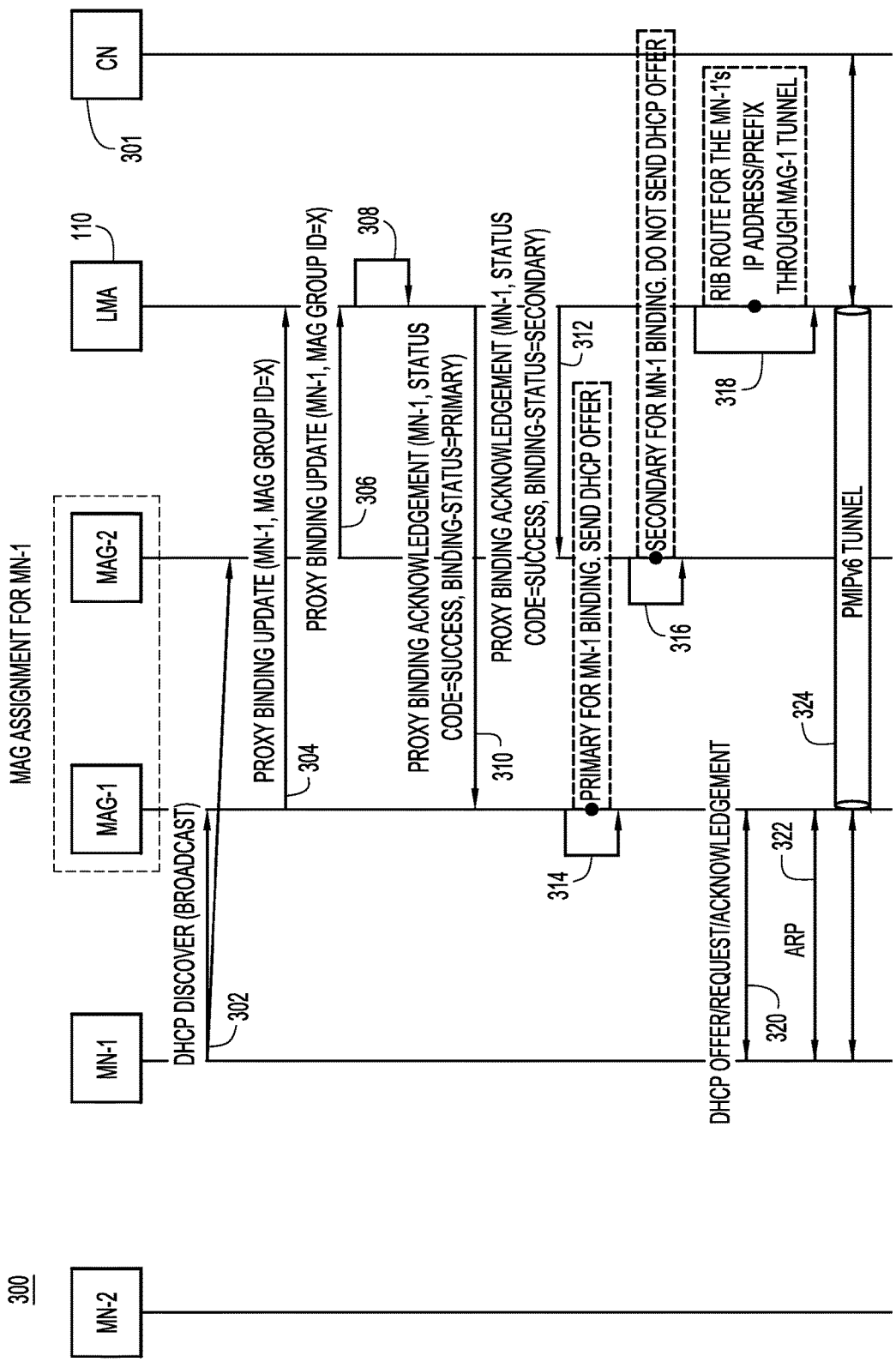
FIG. 3 is an illustration of a transaction sequence of signaling messages in the network environment of FIG. 1 or FIG. 2 in which a first gateway is primary to actively handle a mobility session on behalf of a first mobile node and a second gateway is secondary to operate in active standby, according to an example embodiment.

With reference to FIG. 3, there is shown an example transaction sequence 300 of signaling messages and/or operations performed in network environment 100 or 200 in which LMA 110 assigns MAG-1 as a primary MAG for handling a mobility session on behalf of mobile node MN-1, and MAG-2 as a secondary MAG for the mobility session. Transaction sequence 300 introduces a core network (CN) 301 connected with LMA 110 and which may form part of network 112. Thus, for each of the operations described below, the primary MAG is MAG-1, the secondary MAG is MAG-2, and the mobile node is mobile node MN-1.

At 302, mobile node MN-1 wirelessly transmits a broadcast discovery request, such as a Dynamic Host Configuration Protocol (DHCP) Discovery message, which is received by both MAG-1 and MAG-2. MAG-1 and MAG-2 each detects the mobile node request as a request to establish a mobility session with core network 301 through LMA 110 and either one of MAG-1 and MAG-2.

At 304, responsive to the received discovery request or an attach trigger from mobile node MN-1, MAG-1 sends a respective Proxy Binding Update (PBU) including an identifier of mobile node MN-1 and an identifier (ID) of MAG-1 to LMA 110, which receives the PBU. The PBU is an example of a request to create a mobility session and form an IP tunnel. Thus, the PBU may be referred to more generally as an "IP tunnel request," a "mobility session request," a "create session request," or simply as a "session request."

At 306, responsive to the received discovery request or an attach trigger from mobile node MN-1, MAG-2 sends a respective PBU including an identifier of mobile node MN-1 and an identifier of MAG-2 to LMA 110, which receives the PBU.

At 308, responsive to the PBUs received from MAG-1 and MAG-2, LMA 110 selects, based one or more gateway selection criteria, MAG-1 as a primary MAG to actively handle a mobility session on behalf of mobile node MN-1, and MAG-2 as a secondary MAG to operate in active standby to handle a failover of the mobility session from the primary MAG.

At 310, based on the selection at 304, LMA 110 commands MAG-1 to operate as the primary (or active) MAG and wirelessly configure mobile node MN-1 for the mobility session. To do this, LMA 110 sends to MAG-1 a first Proxy Binding Acknowledgement (PBA) including (i) a primary (or active) binding indicator or flag ("Binding-Status=Primary") to command the MAG to operate as the primary MAG for the mobility session, (ii) the mobile node identifier (for mobile node MN-1), (iii) a default router IP address for the MAG to be used in the mobility session, (iv) an IP address (or IP address prefix) for the mobile node for the mobility session as assigned by LMA 110, and (iv) an IP address of LMA 110. The PBA is an example of a tunnel request acknowledgement, and may be referred to more generally as a "session request acknowledgement."

The PBUs and PBAs mentioned above may be replaced with other messages associated with other protocol options, as specified in RFC5213 and RFC5844, for example, so long as the following mobility options are provided: Mobile Node ID and MAG Group ID from the PBU; and Mobile Node ID, Status Code, and Binding-Status from the PBA.

At 312, also based on the selections at 304, LMA 110 commands MAG-2 to operate as the secondary (or standby) MAG and to not configure mobile node MN-1 for the mobility session. To do this, LMA 110 sends to MAG-2 a second Proxy Binding Acknowledgement (PBA) including (i) a secondary (or standby) binding indicator or flag ("Binding-Status=Secondary") to command the MAG to operate as the secondary MAG for the mobility session, (ii) the mobile node identifier (for mobile node MN-1), (iii) a default router IP address for the MAG to be used in the mobility session in case of a failover of the mobility session from MAG-1, (iv) an IP address of the mobile node for the mobility session, and (v) an IP address of LMA 110. LMA 110 assigns a common default router IP address to both the primary and secondary MAGs, i.e., the default router IP address is the same in each of the first and second PBAs. Also, the mobile node IP address is the same in each of the first and second PBAs, and the LMA IP address is the same in each of the first and second PBAs.

Responsive to the primary binding indicator, the primary MAG performs actions associated with each of transactions/operations 314, 320, 322, and 324, described below.

At 314, responsive to the primary binding indicator, the primary MAG creates primary (or active) bindings or mappings between the default router IP address, the LMA IP address, and the mobile node IP address and stores the primary bindings in a forwarding table of the primary MAG. The primary bindings are active bindings because they will be used to actively handle the mobility session. Such a "binding" between addresses also represents a pre-populated forwarding or routing state for a MAG (or LMA 110 if the binding is created by the LMA) that may be activated or deactivated at any given time, as will become apparent from the ensuing description.

At 316, the secondary MAG creates secondary (or standby) bindings between the default router IP address, the LMA IP address, and the mobile node IP address and stores the secondary bindings in a forwarding table of the secondary MAG. The secondary bindings are standby or inactive bindings because they are ready to be used, i.e., activated, to actively handle the mobility session in case of a failover of the mobility session from the primary MAG to the secondary MAG. The primary bindings and the secondary binding exist, i.e., are stored, concurrently in the primary and secondary MAGs, respectively, to facilitate a near immediate switch-over of the mobility session from the primary MAG to the secondary MAG, which entails deactivating the primary bindings and activating the secondary bindings.

At 318, LMA 110 creates LMA primary (or active) bindings between the default router IP address, the LMA IP address, and the mobile node IP address and stores the primary bindings in an LMA Routing Information Base (RIB) or forwarding table to enable the LMA to route IP packets associated with the mobile node through an IP tunnel between the LMA and the primary MAG, once established. LMA 110 also creates LMA secondary (or standby/inactive) bindings between the default router IP address, the LMA IP address, and the mobile node IP address and stores the secondary binding in the LMA RIB or forwarding table to enable the LMA to route IP packets associated with the mobile node through an IP tunnel between the LMA and the secondary MAG, once the secondary bindings are activated when/if a failover occurs.

At 320, the primary MAG and mobile node MN-1 exchange DHCP messages, including a DHCP offer (from the MAG to the mobile node), a DHCP request (from the mobile node to the MAG), and a DHCP acknowledgement (from the MAG to the mobile node) by which the primary MAG sends to the mobile node (and the mobile node thus acquires) its mobile node IP address.

At 322, the primary MAG receives from mobile node MN-1 an Address Resolution Protocol (ARP) query. Assuming the primary MAG is MAG-1 and is configured or provisioned with a layer 2 media access control (MAC) address Mac-1 for communications on local network 106, the primary MAG responds to the ARP query with an ARP response to indicate its layer 2 address Mac-1 to mobile node MN-1.

Through operations 320 and 322 above, the primary MAG wirelessly configures mobile node MN-1 for the mobility session in that the primary MAG sends to the mobile node the mobile node an IP address and the primary MAG layer 2 address.

At 324, the primary MAG and LMA 110 establish an IP tunnel with each other and route IP packets to and from mobile node MN-2 and from and to core network 301. To route the IP packets through the IP tunnel, the primary MAG uses the primary mappings created at 314 and LMA 110 uses the LMA mappings created at 318.

Figure 4:
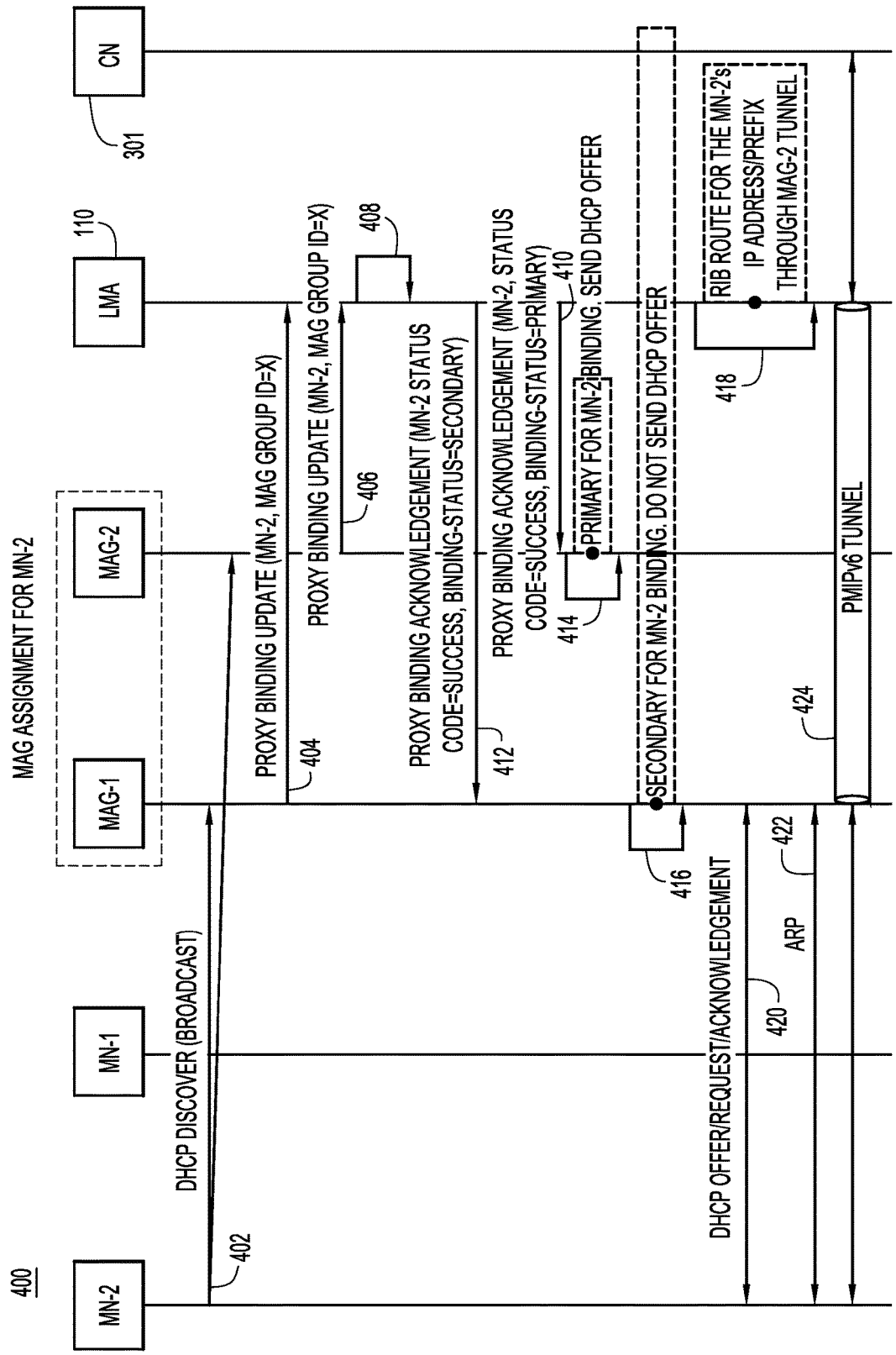
FIG. 4 is an illustration of a transaction sequence of signaling messages in the network environment of FIG. 1 or FIG. 2 in which the second gateway is primary to actively handle a mobility session on behalf of a second mobile node and the first gateway is secondary to operate in active standby, according to an example embodiment.

With reference to FIG. 4, there is shown an example transaction sequence 400 of signaling messages and/or operations performed in network environment 100 or 200 in which LMA 110 assigns MAG-2 as a primary MAG for handling a mobility session on behalf of mobile node MN-2, and MAG-1 as a secondary MAG for the mobility session. Thus, for each of the transactions/operations described below, the primary MAG is MAG-2, the secondary MAG is MAG-1, and the mobile node is mobile node MN-2.

Transaction sequence 400 includes operations 402-424 that are generally the same as operations 302-324 of transaction sequence 300, except that MAG-1 and MAG-2 switch roles from primary and secondary to secondary and primary, and mobile node MN-2 replaces mobile node MN-1. In light of the similarity between transaction sequences 300 and 400, the description of operations 302-324 shall suffice for operations 402-424.

Note that at 422 in transaction sequence 400, the primary MAG (now MAG-2) receives from the mobile node (now mobile node MN-2) an ARP query. Assuming the primary MAG is MAG-2 and is configured or provisioned with a layer 2 media access control address Mac-2 for communications on local network 106, the primary MAG responds to the ARP query with an ARP response to indicate the MAG-2 layer 2 address, Mac-2, to the mobile node (mobile node MN-2).

Transaction sequences 300 and 400 may be timed with respect to each other such that when both of the transaction sequences have completed, the mobility sessions for mobile nodes MN-1 and MN-2 respectively anchored on primary MAG-1 (for MN-1) and primary MAG-2 (for MN-2) exist concurrently. In this case, each of MAG-1 and MAG-2 is configured to actively handle a respective mobility session and to operate in active standby concurrently with the other MAG. Also, as additional mobile nodes seek to establish respective mobility sessions with the core networks through MAG-1, MAG-2, and LMA 110, additional transaction sequences similar to transactions sequences 300 and 400 are performed to establish the respective mobility sessions.

It is understood that transaction sequences 300 and 400 are not limited to two MAGs and thus may be extended to cover embodiments that include more than two MAGs, such as three or more MAGs. In such embodiments, LMA 110 selects from among the more than two MAGs a primary MAG and a secondary MAG (or multiple secondary MAGs) as an active standby MAG (or as multiple active standby MAGs) based on gateway selection criteria evaluated across all of the more than two MAGs, for example.

Figure 5:
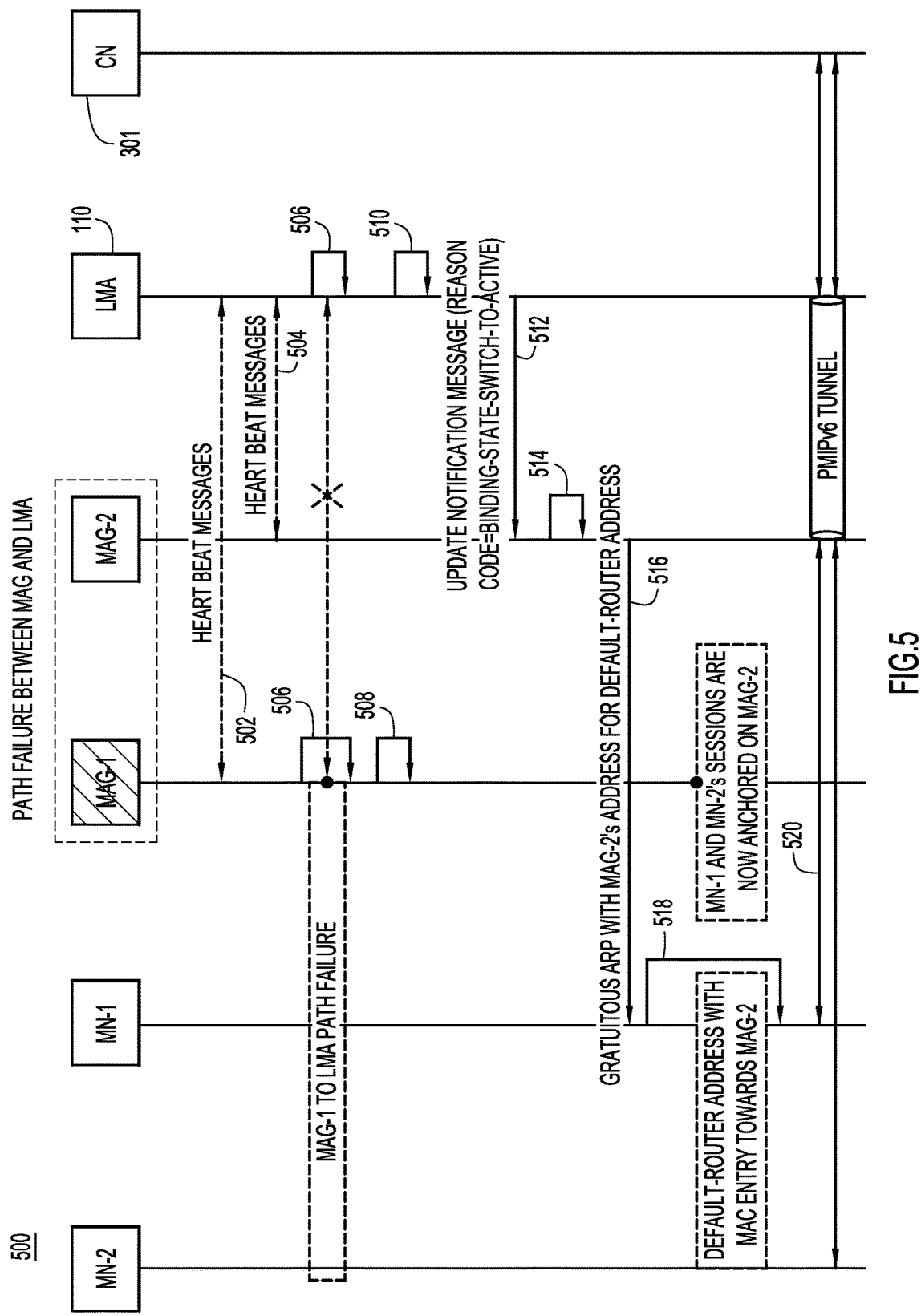
FIG. 5 is an illustration of a transaction sequence of signaling messages in the network environment of FIG. 1 or FIG. 2 used for failover from a primary gateway to a secondary gateway as a result of a path failure between the primary gateway and a local mobility anchor (LMA), according to an example embodiment.

With reference to FIG. 5, there is shown an example transaction sequence 500 of signaling messages in network environment 100 or 200 used for failover recovery from a primary MAG to a secondary MAG as a result of a path failure between the primary MAG and LMA 110. In the example of FIG. 5, it is assumed that transaction sequence 300 has been completed to establish the mobility session for node MN-1, with MAG-1 and MAG-2 serving as primary and secondary MAGs, respectively.

At 502, MAG-1 and LMA 110 monitor periodic "heart beat" messages exchanged over a communication path between MAG-1 and the LMA. The presence and the absence of the periodic heart beat respectively indicate communication path connectivity success and failure.

At 504, MAG-2 and LMA 110 also monitor periodic heart beat messages exchanged over a communication path between MAG-2 and the LMA.

At 506, responsive to the monitoring at 502, MAG-1 and LMA 110 each detect an absence of the heart beat messages for a predetermined period of time that indicates a path failure on the communication path between MAG-1 and the LMA.

At 508, responsive to the detected path failure on the path between MAG-1 and LMA 110, MAG-1: transitions its primary (active) bindings created at operation 314 to secondary (inactive) bindings with respect to mobile node MN-1; removes its current policy based routing (PBR) state; and does not send a proxy ARP.

At 510, responsive to the detected path failure, but continued presence of the heart beat messages from MAG-2, LMA 110 updates the LMA RIB to transition the primary binding (for MAG-1) to secondary and the secondary binding (for MAG-2) to primary (i.e., MAG-1 becomes secondary and MAG-2 becomes primary).

At 512, also responsive to the detected path failure, but continued presence of the heart beat messages from MAG-2, LMA 110 sends and Update Notification Message including a "Binding-State-Switch-to-Active" indicator or flag to MAG-2 (which receives the message) to command MAG-2 to switch from the secondary (standby) MAG to the primary (active) MAG.

Responsive to receipt of the Update Notification Message, MAG-2 performs actions in transactions/operations 514, 516, and 518.

At 514, MAG-2 transitions its secondary binding to primary to create a forwarding state that indicates the IP address of mobile node MN-1.

At 516, MAG-2 sends a Gratuitous ARP message including the default router IP address for MAG-2 (which is the same as the default router IP address used by MAG-1) and the layer 2 address Mac-2 to mobile node MN-1. Thus, MAG-2 wirelessly configures mobile node MN-1 to use MAG-2 for the mobility session instead of MAG-1.

At 518, mobile node MN-1 directs traffic to MAG-2 based on the default router IP address and layer 2 Mac-2 for MAG-2 with which it was configured at 516.

At 520, MAG-2 and LMA 110 establish an IP tunnel with each other to handle mobility session traffic on behalf of mobile node MN-1. This IP tunnel may exist concurrently with the IP tunnel established at operation 424 for the mobility session for mobile node MN-2.

Figure 6:
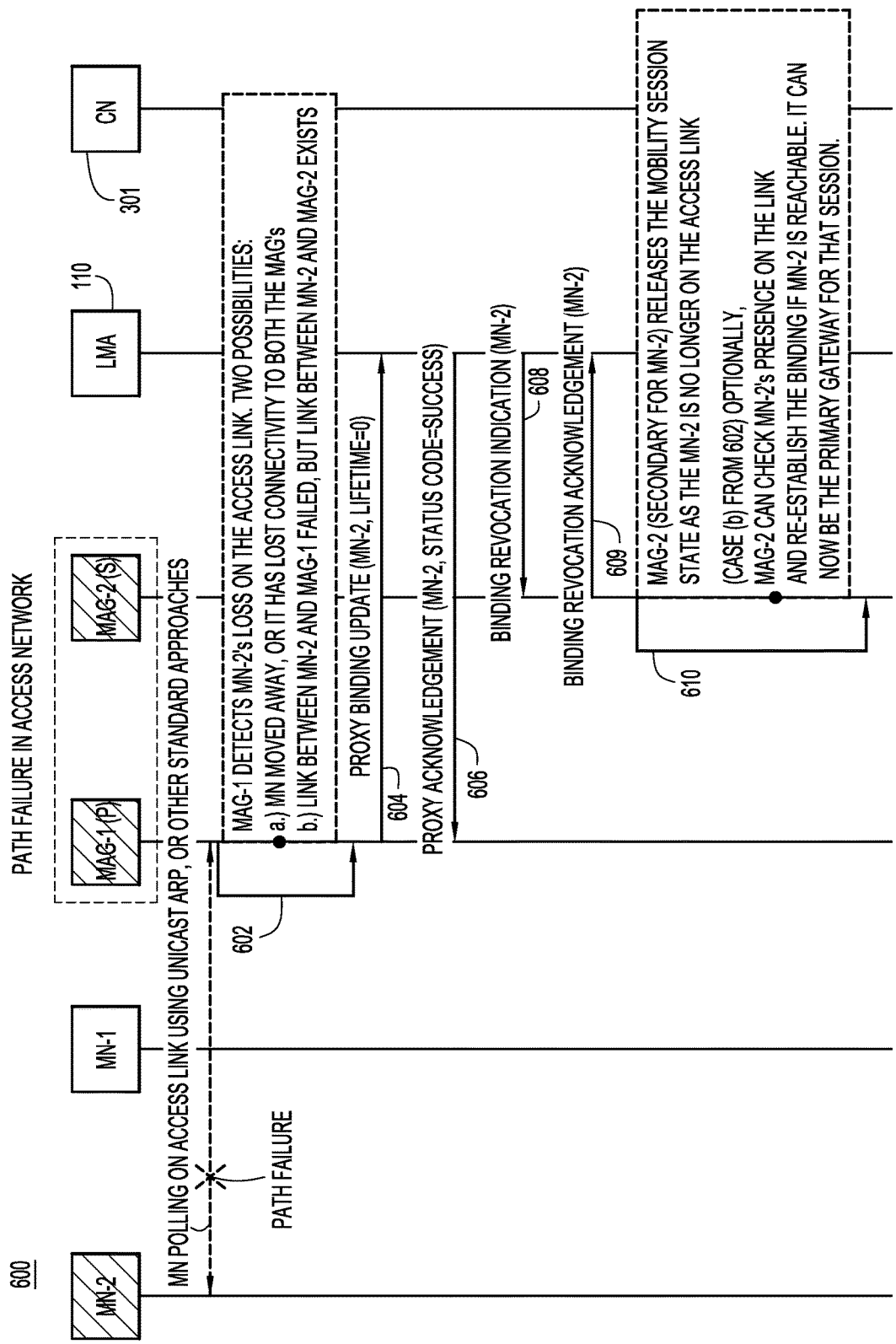
FIG. 6 is a transaction sequence of signaling messages in the network environment of FIG. 1 or FIG. 2 that results from a path failure on the access link/network through which a mobile node attaches to a gateway, according to an example embodiment.

With reference to FIG. 6, there is shown an example transaction sequence 600 of signaling messages in network 100 or 200 that results from a path failure on the access link/network through which a mobile node attaches to a MAG. It is assumed that transaction sequence 400 has been completed before transaction sequence 600 begins, such that a mobility session on behalf of mobile node MN-2 uses MAG-1 and MAG-2 as secondary and primary MAGs, respectively.

At 602, MAG-1 (the secondary MAG for mobile node MN-2) detects a path failure between mobile node MN-2 and MAG-1 due to a failure of local network 106 or any of APs 102, for example, which represents a failure of the access network. MAG-1 may detect the path failure by monitoring the access network for polling requests transmitted periodically by mobile node MN-2, and then detecting the path failure when the monitoring indicates an absence of the polling requests for a predetermined time period.

At 604, responsive to the detected path failure, MAG-1 sends to LMA 110 (and the LMA receives) a PBU indicating the identifier of mobile node MN-2 and a network access path failure with respect to that mobile node, e.g., indicated by a "lifetime=0" in the PBU. The PBU in this case is an example of a "link lost" message indicative of the path failure.

At 606, responsive to the PBU, LMA 110 sends to MAG-1 (and MAG-1 receives) a PBA acknowledging receipt of the PBU.

At 608, also responsive to the PBU, LMA 110 sends to MAG-2 (the primary MAG actively handling the mobility session on behalf of mobile node MN-2) a Binding Revocation Indication (BRI) that identifies mobile node MN-2 and commands MAG-2 to release the mobility session. LMA 110 sends the BRI because it is assumed that mobile node MN-2 is no longer able to attach to either MAG-1 or MAG-2 due to the detected path failure on the access network.

At 609, responsive to receipt of the BRI, MAG-2 sends to LMA 110 a Binding Revocation Acknowledgement that identifies mobile node MN-2.

At 610, also responsive to the BRI, MAG-2 releases the mobility session as MAG-2 is no longer on the access network. Release of the mobility session includes clearing bindings in MAG-2.

Returning to FIGS. 3 and 4, LMA 110 selects a primary and a secondary MAG at operations 304 and 404 based on one or more gateway selection criteria. LMA 110 collects or determines information related to the gateway selection criteria and then selects a preferred one of MAG-1 and MAG-2 based on the collected or determined criteria information. The gateway selection criteria may include, but are not limited to:

a. Respective link bandwidth capacities of egress links for MAG-1 and MAG-2 (i.e., respective maximum available interface bandwidths between each of MAG-1 and MAG-2 and LMA 110). Such capacity may be a capacity for each IP tunnel or a total capacity for all IP tunnels combined. For example, LMA 110 selects the MAG with a highest egress link capacity as a primary MAG and the other MAG as the secondary MAG.

b. Requested link bandwidths for mobility sessions as specified in PBUs from MAGs 1 and 2 (e.g., requested link bandwidth for a new session for which a PBU is sent from one of the MAGs to the LMA).

c. Respective current usage of the egress link capacities by MAG-1 and MAG-2, e.g., how much of the egress link capacities is each actually being used in mobility sessions on IP tunnels. For example, LMA 110 determines a respective unused egress link capacity for each MAG as a difference between the egress link capacity and the current usage of the egress link for that MAG, and selects the MAG having a highest/greatest amount of unused egress link capacity as a primary MAG and the other MAG as the secondary MAG.

d. Load balancing of MAG-1 and MAG-2 across the egress links, e.g., to establish an even load across the egress links. For example, LMA 110 selects the MAG having a lowest load as a primary MAG and the other MAG as the secondary MAG.

e. Respective numbers of mobility sessions being handled by each of MAG-1 and MAG-2. For example, LMA 110 selects the MAG having a lowest number of actively handled mobility sessions as a primary MAG and the other MAG as the secondary MAG.

f. Use of a round-robin assignment of the primary MAG. For example, LMA 110 alternately selects between MAG-1 and MAG-2 as a primary MAG as mobility sessions are initiated.

g. Network types associated with each of MAG-1 and MAG-2.

h. A combination of two or more of the criteria (a)-(f).

Figure 7:
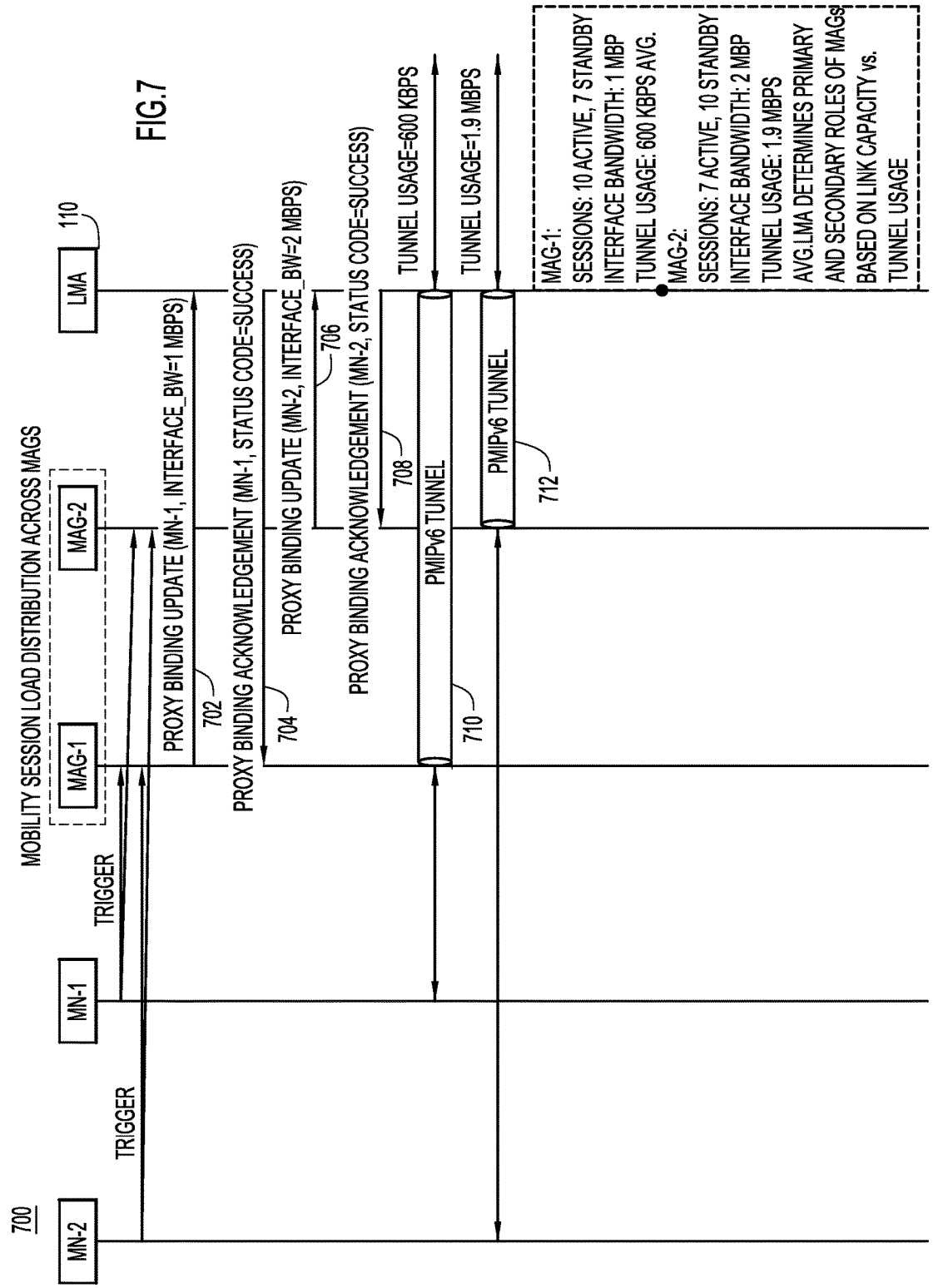
FIG. 7 is an illustration of an example mobility session load distribution for the first and second gateways and on which the local mobility anchor (LMA) may based its selection of a primary gateway, according to an example embodiment.

With reference to FIG. 7, there is an illustration of an example mobility session load distribution 700 for MAG-1 and MAG-2 on which LMA 110 may base its selection of a primary MAG.

At 702, MAG-1 sends to LMA 110 a PBU on behalf of mobile node MN-1 that indicates the MAG has an egress link capacity/maximum bandwidth of 1 Mbps, for example, although other bandwidths may be indicated. The PBU may correspond to the PBU sent by MAG-1 at operation 304, but extended to report the interface bandwidth.

At 704, in response to receipt of the PBU, LMA 110 sends to MAG-1 a PBA acknowledging the PBU. The PBA may correspond to the PBA sent by LMA 110 at operation 306 as discussed above extended to report the bandwidth.

At 706, MAG-2 sends to LMA 110 a PBU on behalf of mobile node MN-2 that indicates the MAG has an egress link capacity/maximum bandwidth of 2 Mbps, for example, although other bandwidths may be indicated. The PBU may correspond to the PBU sent by MAG-2 at operation 404, but extended to report the interface bandwidth.

At 708, in response to receipt of the PBU, LMA 110 sends to MAG-2 a PBA acknowledging the PBU. The PBA may correspond to the PBA sent by LMA 110 at operation 406 as discussed above.

At 710, MAG-1 and LMA 110 establish an IP tunnel with each other based on further signaling message exchanges as shown in FIG. 3, but omitted from FIG. 7 for the sake of clarity. In the example of FIG. 7, the IP tunnel bandwidth usage is indicated at 700 Kbps, which is less than the 1 Mbps (link) capacity of MAG-1. LMA 110 may determine IP tunnel bandwidth usage based on signaling messages associated with operation of the IP tunnel.

At 712, MAG-2 and LMA 110 establish an IP tunnel with each other based on further signaling message exchanges as shown in FIG. 4, but omitted from FIG. 7 for the sake of clarity. In the example of FIG. 7, the IP tunnel bandwidth usage is indicated at 1.9 Mbps, which is less than the 2 Mbps (link) capacity of MAG-2.

Based on information received or determined by LMA 110 in operations 702-704, the LMA knows egress link capacities and bandwidth usage with respect to MAG-1 and MAG-2. Because LMA 110 assigns primary and secondary MAGs, the LMA maintains statistics regarding the assignments, including a number of mobility sessions being actively handled by each of MAG-1 and MAG-2 and a number of mobility sessions for which each of MAG-1 and MAG-2 are operating in standby. In the example of FIG. 7, LMA 110 maintains bindings statistics that indicate MAG-1 is actively handling 10 mobility sessions (i.e., MAG-1 is a primary MAG for 10 mobility sessions) and operating on standby for 7 (i.e., MAG-1 is a secondary MAG for 7 mobility session), while MAG-2 is actively handling 7 mobility sessions and operating on standby for 10. Based on the bindings statistics, the link capacities, and the bandwidth usages determined by LMA 110, the LMA selects the primary and secondary MAGs for a next initiated mobility session.

It is understood that transaction sequences 500-700 are not limited to two MAGs and thus may be extended to cover embodiments that include more than two MAGs, such as three or more MAGs.

Figure 8:
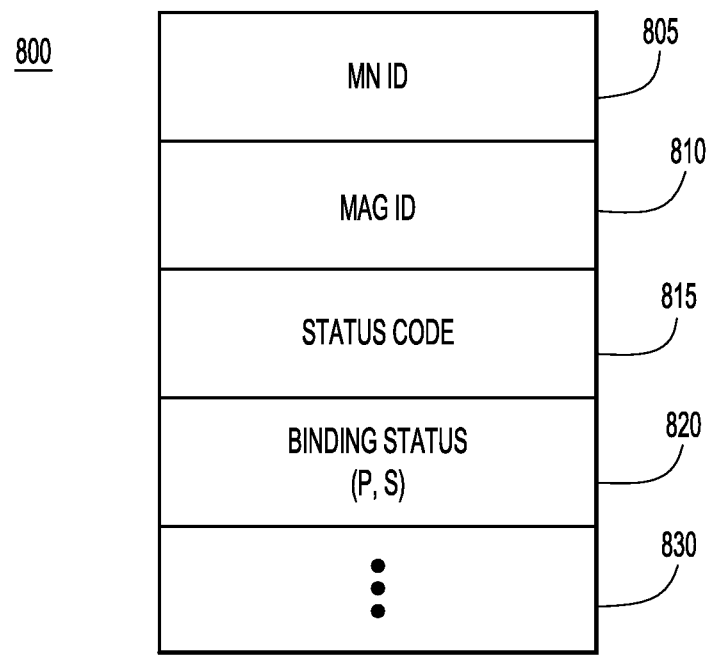
FIG. 8 is an illustration of a Proxy Binding Acknowledgement (PBA) sent by the LMA to either a primary or a secondary gateway, according to an example embodiment.

With reference to FIG. 8, there is an illustration of an example PBA 800 sent by LMA 110 to MAG-1 and MAG-2 as described above. PBA 800 includes a mobile node ID 805, a MAG ID 810, a status code 815 to indicate success or failure, a binding status 820 set equal to either primary or secondary, and further information 830. The PBU includes fields similar to the fields of PBA 800, except that the PBU does not include a binding status that is included in the PBA.

Figure 9:
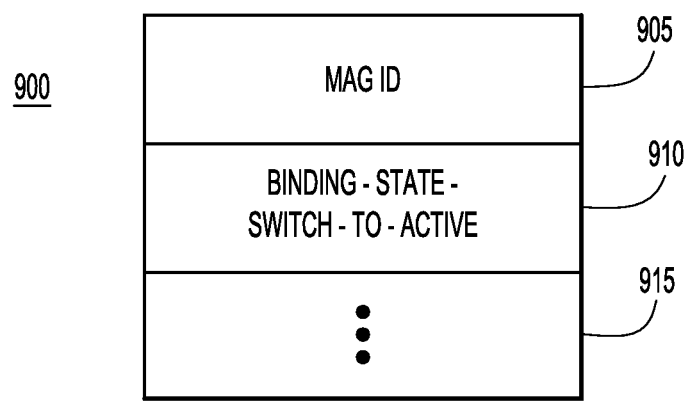
FIG. 9 is an illustration of an Update Notification Message sent by the LMA to a secondary gateway, according to an example embodiment.

With reference to FIG. 9, there is an illustration of an example Update Notification Message 900 sent by LMA 110 to MAG-1 and MAG-2 as described above. Update Notification Message 900 includes a MAG ID 905, a Binding-Status-Switch-to-Active indicator or flag 910, and further information 915.

Figure 10:
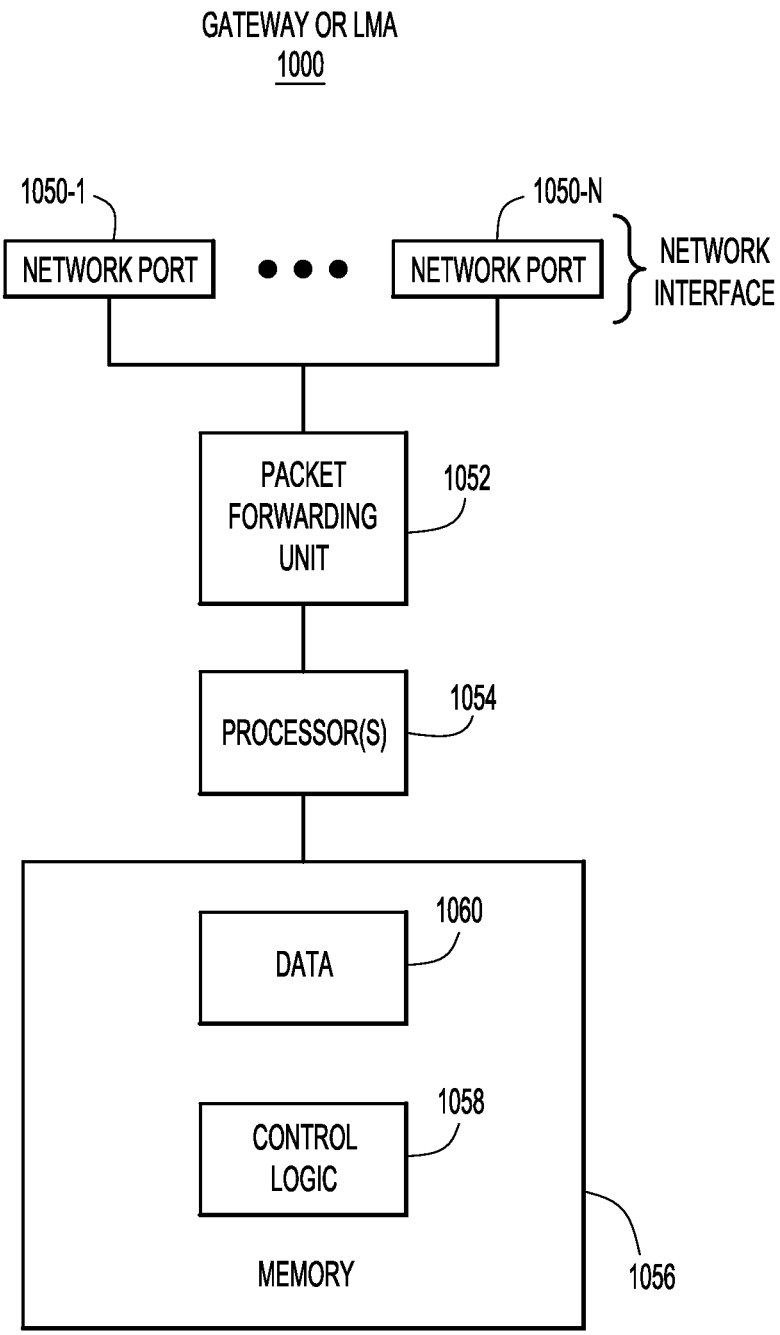
FIG. 10 is a block diagram of a device configured to perform operations according to the embodiments described herein.

With reference to FIG. 10, there is a block diagram of a device or system 1000 to implement the operations in accordance with the embodiments described herein. Device 1000 may be a gateway/MAG or an LMA. To this end, device 1000 may include a plurality of network ports 1050-1 through 1050-N or other form of network interface (also referred to as a "network interface unit"), a packet forwarding unit 1052 including forwarding tables and/or an RIB, a processor 1054 (or multiple processors) and memory 1056. Network ports 1050 may include wired and wireless ports. The wireless ports support wireless connections with wireless networks 120, for example. The memory stores instructions for implementing methods described herein.

The memory 1056 may include read only memory (ROM), random access memory (RAM), magnetic disk storage media devices, optical storage media devices, flash memory devices, electrical, optical, or other physical/tangible (non-transitory) memory storage devices. The processor 1054 is, for example, a microprocessor or a microcontroller that executes instructions stored in memory. Thus, in general, the memory 1056 may comprise one or more tangible computer readable storage media (e.g., a memory device) encoded with software comprising computer executable instructions and when the software is executed (by the processor 1054) it is operable to perform the operations described herein. Memory 1056 may store control logic 1058 to implement operations described above. For example, if computer device 1000 represents a gateway/MAG, control logic 1058 implements operations performed by MAG-1 or MAG-2 as described above. On the other hand, if computer device 1000 is an LMA (e.g., LMA 110), control logic 1058 implements operations performed by LMA 110 as described above. The memory may also store data 1060 used and generated by control logic 1058, such as mobile node IDs and IP addresses, MAG layer 2 Mac addresses, gateway selection criteria, and primary/secondary bindings (which may alternatively be stored in packet forwarding unit 1054).

In summary, embodiments presented herein provide the following features and advantages. A primary gateway operates in an active/active mode while a secondary gateway operates as in hot-standby mode based on two MAGs or two TWAGs in an access network. An LMA determines/selects each MAG role (either Active or Standby) on a mobile node basis based on:

a. Distributing the mobility sessions between two MAGs based on binding counts on each MAG.

b. Learning an interface bandwidth from each MAG and comparing the interface bandwidth with a current traffic usage on a corresponding IP tunnel (to select a primary MAG for the mobility session).

c. A subscription type of a mobile node primary MAG.

d. Available bandwidth.

The LMA detects a path failure to a primary MAG of a mobility session based on heart beat messages. Thereafter, the LMA notifies a secondary MAG to take over the Active role for a mobility session.

A secondary MAG receives an Update Notification Message from the LMA upon a path failure to a primary MAG. Thereafter, the secondary MAG sends a layer-2 unicast Gratuitous ARP for the default-router IP address and switches to an active role for the mobility session.

Two mobile nodes use different layer-2 addresses for the same IP gateway address. In an example, mobile nodes MN-1 and MN-2 use the same access network/link. MAG-1 is primary for MN-1 and MAG-2 is primary for MN-2. The default router IP address for both of the mobile nodes is the IP address obtained from the LMA. When MN-1 sends an ARP request resolving the gateway address, MAG-1 responds with a layer 2 (L2) unicast response with its own Mac address Mac-1. When mobile node MN-2 sends an ARP request resolving the gateway address, MAG-2 responds with an L2 unicast response with its own Mac address Mac-2.

The LMA designates one MAG as primary and the other MAG as secondary for a mobility session. The primary MAG sends the DHCP Offer. The secondary MAG suppresses the DHCP Offer.

The LMA may leverage RFC-7077 notification messages to trigger the MAG after fail-over. The MAG responds to ARP requests only for the mobile node for which it is primary.

Embodiments presented herein also work for both S2a interfaces (GTP and PMIP) of the SaMOG architecture.

In summary, in one form, a method is provided comprising: at a local mobility anchor connected to a network, receiving session requests sent by a first gateway and a second gateway on behalf of a mobile node seeking to establish a mobility session with the network via the local mobility anchor and either the first gateway or the second gateway, and responsive to the received session requests: selecting, based on a gateway selection criterion, either the first gateway or the second gateway as an active gateway for actively handling the mobility session and the other of the first gateway and second gateway as a standby gateway; commanding the active gateway to actively handle the mobility session and to configure the mobile node to use the active gateway for the mobility session; commanding the standby gateway to not configure the mobile node and to operate in active standby to handle a failover of the mobility session from the active gateway; and establishing with the active gateway a first IP tunnel to be used for the mobility session.

In another form, an apparatus is provided comprising: a network interface unit configured to communicate with a first gateway and a second gateway and a network; and a processor of a local mobility anchor and that is coupled to the network interface unit, the processor configured to: receive session requests sent by the first gateway and the second gateway on behalf of a mobile node seeking to establish a mobility session with the network via either the first gateway or the second gateway, and responsive to the received mobility session requests: select, based on a gateway selection criterion, either the first gateway or the second gateway as an active gateway for actively handling the mobility session and the other of the first gateway and second gateway as a standby gateway; command the active gateway to actively handle the mobility session and to configure the mobile node to use the active gateway for the mobility session; command the standby gateway to not configure the mobile node and to operate in active standby to handle a failover of the mobility session from the active gateway; and establish with the active gateway a first IP tunnel to be used for the mobility session.

In yet another form, a method is provided comprising: at a first gateway and a second gateway, wirelessly detecting that a mobile mode seeks to establish a mobility session with a network and, responsive to the detecting, sending respective session requests to a local mobility anchor connected to the network; at the first gateway, receiving from the local mobility anchor a first command to operate as a active gateway, and responsive thereto: wirelessly configuring the mobile node to use the active gateway for the mobility session; and actively handling the mobility session; and at the second gateway, receiving from the local mobility anchor a second command to operate as a standby gateway, and responsive thereto: not configuring the mobile node; and operating in active standby to handle a failover of the mobility session from the active gateway.

In yet another form, a non-transitory processor readable medium is provided. The processor readable medium stores instructions that, when executed by a processor, cause the processor to perform the methods described herein.

The above description is intended by way of example only. Various modifications and structural changes may be made therein without departing from the scope of the concepts described herein and within the scope and range of equivalents of the claims.

What is claimed is:

1. A method comprising:
   at a local mobility anchor connected to a network, receiving session requests sent by a first gateway and a second gateway on behalf of a mobile node seeking to establish a mobility session with the network via the local mobility anchor and either the first gateway or the second gateway, and responsive to the received session requests:
   selecting, based on a gateway selection criterion, either the first gateway or the second gateway as an active gateway for actively handling the mobility session and the other of the first gateway and second gateway as a standby gateway;
   commanding the active gateway to actively handle the mobility session and to configure the mobile node to use the active gateway for the mobility session, the commanding including sending to the active gateway a first session request acknowledgement having an active binding indicator to cause the active gateway to establish active bindings between a mobile node Internet Protocol (IP) address, a common default router IP address for the active gateway, and a local mobility anchor IP address, wherein the active bindings are used to actively handle the mobility session;
   commanding the standby gateway to not configure the mobile node and to operate in active standby to handle a failover of the mobility session from the active gateway; and
   establishing with the active gateway a first Internet Protocol (IP) tunnel to be used for the mobility session.

2. The method of claim 1, wherein the first gateway and the second gateway are each mobile access gateways (MAGs) accessed by the mobile node over one or more wireless access links.

3. The method of claim 1, wherein:
   the commanding the standby gateway includes sending thereto a second session request acknowledgement having a standby binding indicator to cause the standby gateway to establish standby bindings between the mobile node IP address, the common default router IP address for the standby gateway, and the local mobility anchor IP address, wherein the standby bindings exists concurrently with the active bindings and are used to actively handle the mobility session if a failover from the active gateway occurs.

4. The method of claim 3, further comprising, at the local mobility anchor:
receiving a link lost message from the active gateway indicating an access link failure between the active gateway and the mobile node; and
in response to the link lost message, if the local mobility anchor has not received a link lost message from the standby gateway, sending a message to the standby gateway to switch the standby bindings to active bindings so that the standby gateway becomes a primary gateway.

5. The method of claim 1, further comprising, at the local mobility anchor:
after the first IP tunnel is established, detecting a communication failure between the active gateway and the local mobility anchor and, responsive to detecting the communication failure:
commanding the standby gateway to configure the mobile node to use the standby gateway for the mobility session and actively handle the mobility session instead of the active gateway; and
establishing with the standby gateway a second IP tunnel used for the mobility session instead of the first IP tunnel.

6. The method of claim 1, wherein the selecting includes:
determining a respective link bandwidth capacity and a respective current link bandwidth usage for the first gateway and the second gateway with respect to the local mobility anchor; and
selecting the active gateway from among the first gateway and the second gateway based on the respective link bandwidth capacities and the respective current link bandwidth usages.

7. The method of claim 6, wherein the selecting further includes:
determining a requested link bandwidth for the mobility session; and
selecting the active gateway based on the respective link bandwidth capacities, the respective current link bandwidth usages, and the requested link bandwidth.

8. The method of claim 1, wherein the selecting includes:
determining a number of mobility sessions being actively handled by each of the first gateway and the second gateway; and
selecting as the active gateway one of the first gateway and the second gateway having a least determined number of mobility sessions being actively handled.

9. An apparatus comprising:
a network interface unit configured to communicate with a first gateway and a second gateway and a network; and
a processor of a local mobility anchor and that is coupled to the network interface unit, the processor configured to:
receive session requests sent by the first gateway and the second gateway on behalf of a mobile node seeking to establish a mobility session with the network via either the first gateway or the second gateway, and responsive to the received session requests:
select, based on a gateway selection criterion, either the first gateway or the second gateway as an active gateway for actively handling the mobility session and the other of the first gateway and second gateway as a standby gateway;
command the active gateway to actively handle the mobility session and to configure the mobile node to use the active gateway for the mobility session, wherein the processor is configured to command the active gateway by sending thereto a first session request acknowledgement having an active binding indicator to cause the active gateway to establish active bindings between a mobile node Internet Protocol (IP) address, a common default router IP address for the active gateway, and a local mobility anchor IP address, wherein the active bindings are used to actively handle the mobility session;
command the standby gateway to not configure the mobile node and to operate in active standby to handle a failover of the mobility session from the active gateway; and
establish with the active gateway a first Internet Protocol (IP) tunnel to be used for the mobility session.

10. The apparatus of claim 9, wherein:
the processor is configured to command the standby gateway by sending thereto a second session request acknowledgement having a standby binding indicator to cause the standby gateway to establish standby bindings between the mobile node IP address, the common default router IP address for the standby gateway, and the local mobility anchor IP address, wherein the standby bindings exists concurrently with the active bindings and are used to actively handle the mobility session if a failover from the active gateway occurs.

11. The apparatus of claim 9, wherein the processor is further configured to:
after the first IP tunnel is established, detect a communication failure between the active gateway and the local mobility anchor and, responsive to detecting the communication failure:
command the standby gateway to configure the mobile node to use the standby gateway for the mobility session and actively handle the mobility session instead of the active gateway; and
establish with the standby gateway a second IP tunnel used for the mobility session instead of the first IP tunnel.

12. The apparatus of claim 9, wherein the processor is configured to select by:
determining a respective communication bandwidth of each of the first gateway and the second gateway with respect to the local mobility anchor; and
selecting as the active gateway one of the first gateway and the second gateway having a greatest determined communication bandwidth.

13. The apparatus of claim 9, wherein the processor is further configured to select by:
determining a number of mobility sessions being actively handled by each of the first gateway and the second gateway; and
selecting as the active gateway one of the first gateway and the second gateway having a least determined number of mobility sessions being actively handled.

14. The apparatus of claim 9, wherein the processor is configured to select by:
  determining a respective link bandwidth capacity and a respective current link bandwidth usage for the first gateway and the second gateway with respect to the local mobility anchor; and
  selecting the active gateway from among the first gateway and the second gateway based on the respective link bandwidth capacities and the respective current link bandwidth usages.

15. The apparatus of claim 14, wherein the processor is further configured to select by:
  determining a requested link bandwidth for the mobility session; and
  selecting the active gateway based on the respective link bandwidth capacities, the respective current link bandwidth usages, and the requested link bandwidth.

16. The apparatus of claim 9, wherein the processor is configured to select by:
  determining a number of mobility sessions being actively handled by each of the first gateway and the second gateway; and
  selecting as the active gateway one of the first gateway and the second gateway having a least determined number of mobility sessions being actively handled.

17. A method comprising:
  at a first gateway and a second gateway, wirelessly detecting that a mobile mode seeks to establish a mobility session with a network and, responsive to the detecting, sending respective session requests to a local mobility anchor connected to the network;
  at the first gateway, receiving from the local mobility anchor a first command to operate as an active gateway, the receiving the first command including receiving a first session request acknowledgement including a mobile node Internet Protocol (IP) address, a common default router IP address for the active gateway, and an active binding indicator that indicates that the first gateway is to operate as the active gateway, and responsive thereto:
    wirelessly configuring the mobile node to use the active gateway for the mobility session; and
    actively handling the mobility session, wherein the actively handing includes, responsive to the active binding indicator:
      establishing active bindings between the mobile node IP address and the common default router IP address and using the active bindings to actively handle the mobility session; and
      establishing an IP tunnel with the local mobility anchor to actively handle the mobility session; and
  at the second gateway, receiving from the local mobility anchor a second command to operate as a standby gateway, and responsive thereto:
    not configuring the mobile node; and
    operating in active standby to handle a failover of the mobility session from the active gateway.

18. The method of claim 17, wherein:
  the receiving the second command includes receiving a second session request acknowledgement including the mobile node IP address, the common default router IP address for the standby gateway, and a standby binding indicator to indicate the second gateway is to operate as the standby gateway; and
  the operating in active standby includes, in response to the standby binding indicator, establishing standby bindings between the mobile node IP address and the common default router IP address and that exists concurrently with the active bindings, wherein the standby bindings become active to enable the standby gateway to actively handle the mobility session when a failover from the active gateway occurs.

19. The method of claim 18, further comprising:
  at the active gateway, detecting a loss of connectivity to the mobile node and responsive thereto sending to the local mobility anchor a link lost message indicating an access link failure between the active gateway and the mobile node; and
  at the standby gateway, receiving from the local mobility anchor a binding revocation command and responsive thereto, clearing the standby bindings.

20. The method of claim 17, further comprising, at the standby gateway:
  receiving from the local mobility anchor an update command indicative of a failure in communication between the active gateway and the local mobility anchor and, responsive thereto:
    wirelessly sending a message to the mobile node to configure the mobile node to use the standby gateway for the mobility session; and
    actively handling the mobility session instead of the active gateway, the actively handling including establishing with the local mobility anchor a second IP tunnel used for the mobility session instead of the first IP tunnel.

21. The method of claim 20, wherein:
  the first command and the second command each include a common default router IP address assigned to each of the first gateway and the second gateway by the local mobility anchor;
  the wirelessly configuring the mobile node by the active gateway includes sending from the active gateway to the mobile node the common default router IP address, the mobile node IP address, and a layer 2 address of the active gateway; and
  the wirelessly configuring the mobile node by the standby gateway includes sending from the standby gateway to the mobile node the common default router IP address, the mobile node IP address, and a layer 2 address of the standby gateway that is different from the layer 2 address of the active gateway.

22. The method of claim 17, wherein:
  the sending respective session requests includes sending respective proxy binding updates each including an identity of the mobile node and an identity of the respective one of the first gateway and second gateway;
  the receiving the first command includes receiving the first command as a first proxy binding acknowledgement including a common default router IP address assigned to the active gateway by the local mobility and extended to include an active status indicator to indicate that the active gateway is to actively handle the mobility session; and
  the receiving the second command includes receiving the second command as a second proxy binding acknowledgement including the common default router IP address assigned to the standby gateway by the local mobility router and extended to include a standby binding status indicator to indicate that the standby gateway is to operate in active standby.

* * * * *

UNITED STATES PATENT AND TRADEMARK OFFICE
CERTIFICATE OF CORRECTION

PATENT NO. : 9,847,932 B2
APPLICATION NO. : 14/848900
DATED : December 19, 2017
INVENTOR(S) : Gundavelli et al.

It is certified that error appears in the above-identified patent and that said Letters Patent is hereby corrected as shown below:

On the Title Page

Item (75) Inventors:
Change "Jason D. Dachtler" to --Jason G. Dachtler--

Signed and Sealed this
Tenth Day of April, 2018

Andrei Iancu
*Director of the United States Patent and Trademark Office*